No. 864,577. PATENTED AUG. 27, 1907.
A. VERNET.
ADJUSTABLE HANDLE BAR FOR VELOCIPEDES OR LIKE VEHICLES.
APPLICATION FILED FEB. 11, 1907.
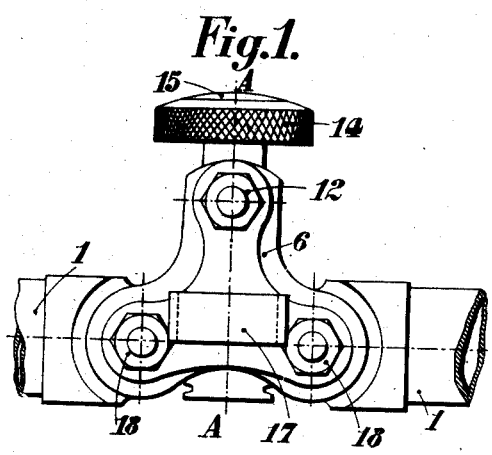
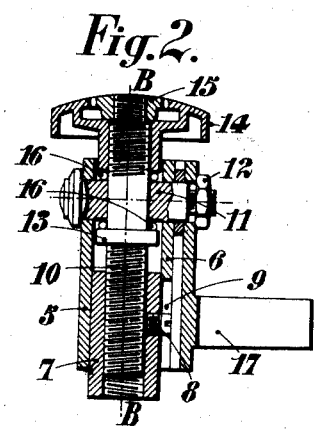
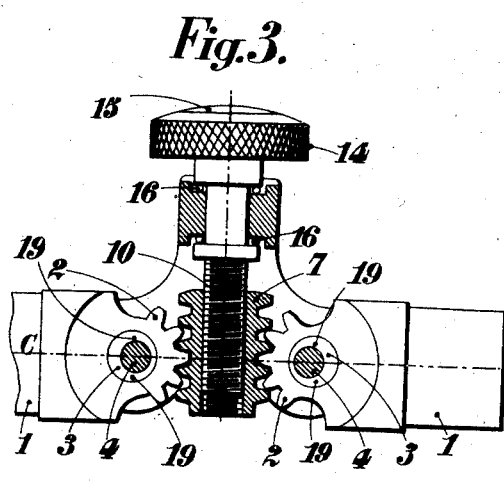
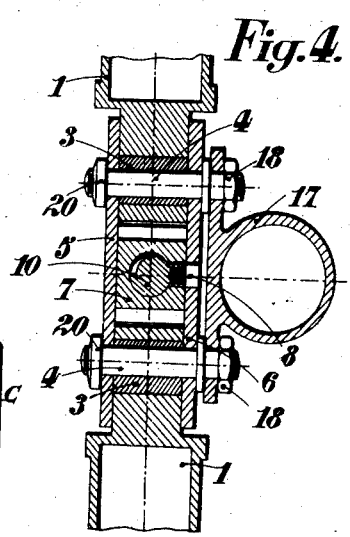
Witnesses:
Inventor
Arthur Vernet
By James L. Norris
Atty

UNITED STATES PATENT OFFICE.

ARTHUR VERNET, OF DIJON, FRANCE.

ADJUSTABLE HANDLE-BAR FOR VELOCIPEDES OR LIKE VEHICLES.

No. 864,577.  Specification of Letters Patent.  Patented Aug. 27, 1907.

Application filed February 11, 1907. Serial No. 356,794.

*To all whom it may concern:*

Be it known that I, ARTHUR VERNET, a citizen of the French Republic, residing at Dijon, Department of the Côte d'Or, France, and having post-office address 4 Rue de Colmar, in the said city, have invented certain new and useful Improvements in Adjustable Handle-Bars for Velocipedes or Like Vehicles, of which the following is a specification.

This invention has for its object improvements in adjustable handle-bars for velocipedes or like vehicles, in which the internal ends of both handle bars are provided with toothed sectors set in gear with a double rack. This rack forms the nut of a vise which is turned in one way or the other, in order to make the handle-bars rise or fall.

The object of this invention is mainly to provide the toothed sectors of the handle-bars with means permitting of varying their distance from the rack.

I will describe my invention with reference to the accompanying drawings in which:

Figure 1 is an elevation view of a device according to the invention; Fig. 2 is a vertical section through line A—A of Fig. 1; Fig. 3 is a vertical section through line B—B of Fig. 2; Fig. 4 is a horizontal section through line C—C of Fig. 3.

The two arms 1, 1 of the adjustable handle-bar are terminated in toothed sectors 2, 2, mounted each one on an eccentric tube 3. These latter are engaged around axles 4, 4 carried by flasks 5, 6.

The teeth of the sectors 2 are in gear with a double rack 7; this rack, which is square in transverse section (Fig. 4), slides between the two flasks 5, 6 and is directed by means of a stud 8 engaging in a groove 9 made in the flask 6.

The rack forms the nut of a vise 10, a part of which is round and goes through a transverse bolt 11 connecting the flasks 5 and 6. This bolt terminates on the one hand in a round shaped head and on the other hand, in a threaded part on which is situated a nut 12. The vise 10 carries a ring 13 solid with it and is provided with a nut 14 maintained by means of a counter-nut 15. Roller bearings 16 are situated between the nut 14 and the bolt 11, and between the bolt 11 and the ring 13.

The whole of the apparatus is fixedly secured to a piece 17 by means of the nut 12 of the bolt 11 and by means of the nuts 18 engaged on the threaded ends of the axles 4. The piece 17 is brazed on the steering tube of the velocipede or like vehicle.

The driver, maintaining with one hand the steering-mechanism, acts with the other hand on the nut 14; the vise 10 is turned and the rack 7 goes up or down. By this means the two arms 1, 1 of the handle-bars turn around the tubes 3, 3, and come in the desired position.

The tubes 3, 3 may be turned around the axles 4, 4 in order that the toothed sectors 2, 2 may go nearer or farther from the rack 7. Such result is obtained, by example, by means of two holes 19 made in each tube 3 and diametrically opposed. A key or a lever provided with pins corresponding to these holes is used in this way. When the tubes have been turned the desired distance, the nuts 20 are serrated and the tubes are clasped between the flasks 5 and 6.

Having thus described and ascertained the nature of my invention and in what manner the same may be performed, I declare that what I claim is:

1. In an adjustable handle bar for velocipedes, a nut of relatively great diameter terminating in a vise having a very short pitch, a nut in engagement with the vise and having a double rack exterior portion, and toothed sectors coöperative with the nut and terminating in arms forming the handle bars, the first mentioned nut having ball bearings.

2. In an adjustable handle bar, a flask element, a rotatable nut mounted in said flask element and having an exteriorly threaded vise, a rack element in engagement with the threaded vise, and toothed sectors pivotally connected to the flask element and in engagement with the rack element, said sectors having extensions forming arms.

In testimony whereof I have hereunto set my hand in presence of two subscribing witnesses.

ARTHUR VERNET.

Witnesses:
 JULES BARDOUX,
 PIERRE GALION.